US011228608B2

(12) United States Patent
Wittenschlaeger (10) Patent No.: US 11,228,608 B2
(45) Date of Patent: *Jan. 18, 2022

(54) VECTOR-BASED ANOMALY DETECTION (71) Applicant: Nant Holdings IP, LLC, Culver City, CA (US)

(72) Inventor: Thomas Wittenschlaeger, Flowery Branch, GA (US)

(73) Assignee: NANT HOLDINGS IP, LLC, Culver City, CA (US)

( * ) Notice: Subject to any disclaimer, the term of this patent is extended or adjusted under 35 U.S.C. 154(b) by 92 days.

This patent is subject to a terminal disclaimer.

(21) Appl. No.: 16/746,797

(22) Filed: Jan. 17, 2020

(65) Prior Publication Data

US 2020/0228555 A1 Jul. 16, 2020

Related U.S. Application Data

(63) Continuation of application No. 16/248,305, filed on Jan. 15, 2019, now Pat. No. 10,542,027, which is a (Continued)

(51) Int. Cl.
*H04L 29/06* (2006.01)
*G06F 21/55* (2013.01)

(52) U.S. Cl.
CPC ........ *H04L 63/1425* (2013.01); *G06F 21/552* (2013.01); *H04L 63/18* (2013.01); *H04L 63/1408* (2013.01)

(58) Field of Classification Search
CPC . H04L 63/1425; H04L 63/18; H04L 63/1408; G06F 21/552
See application file for complete search history.

(56) References Cited

U.S. PATENT DOCUMENTS 6,073,089 A 6/2000 Baker
6,088,804 A 7/2000 Hill
(Continued)

FOREIGN PATENT DOCUMENTS

EP 2051468 4/2009
EP 2120181 11/2009

OTHER PUBLICATIONS

Fu, et al., Exploring Event Correlation for Failure Prediction in Coalitions of Clusters, 2007.
(Continued)

*Primary Examiner* — Theodore C Parsons
(74) *Attorney, Agent, or Firm* — Harness Dickey & Pierce P.L.C.

(57) ABSTRACT

A hybrid-fabric apparatus comprises a black box memory configured to store a plurality of behavior metrics and an anomaly agent coupled to the black box. The anomaly agent determines a baseline vector corresponding to nominal behavior of the fabric, wherein the baseline vector comprises at least two different behavior metrics that are correlated with each other. The anomaly agent disaggregates anomaly detection criteria into a plurality of anomaly criterion to be distributed among network nodes in the fabric, the anomaly detection criteria characterizing a variation from the baseline vector, and each of the plurality of anomaly criterion comprising a function of a measured vector of behavior metrics. The variation can be calculated based on a variation function applied to a vector of measured behavior metrics having elements corresponding to member elements of the baseline vector. Anomaly criterion statuses calculated by at least some of the plurality of network nodes are aggregated to detect anomalous behavior. Each anomaly criterion status can be calculated by a network node as a function of the
(Continued)

network node's anomaly criterion and a measured vector of the at least two different behavior metrics.

29 Claims, 4 Drawing Sheets

Related U.S. Application Data continuation of application No. 15/480,646, filed on Apr. 6, 2017, now Pat. No. 10,218,732, which is a continuation of application No. 14/887,842, filed on Oct. 20, 2015, now Pat. No. 9,716,723, which is a continuation of application No. 14/181,228, filed on Feb. 14, 2014, now Pat. No. 9,197,658, which is a continuation of application No. 13/024,176, filed on Feb. 9, 2011, now Pat. No. 8,683,591.

(60) Provisional application No. 61/415,267, filed on Nov. 18, 2010.

(56) References Cited

U.S. PATENT DOCUMENTS

| | | | |
|---|---|---|---|
| 7,017,186 B2 | 3/2006 | Day | |
| 7,234,168 B2 | 6/2007 | Gupta | |
| 7,519,860 B2 | 4/2009 | Hatonen | |
| 7,603,709 B2 | 10/2009 | Lewis | |
| 7,613,668 B2 | 11/2009 | Hoglund | |
| 7,712,133 B2 | 5/2010 | Raikar | |
| 7,779,119 B2 | 8/2010 | Ginter | |
| 7,779,463 B2 | 8/2010 | Stolfo | |
| 7,779,466 B2 | 8/2010 | Judge | |
| 7,784,097 B1 | 8/2010 | Stolfo | |
| 7,784,099 B2 | 8/2010 | Benjamin | |
| 7,793,138 B2 | 9/2010 | Rastogi | |
| 7,917,393 B2 | 3/2011 | Valdes | |
| 2003/0028803 A1 | 2/2003 | Nelson | |
| 2003/0225520 A1 | 12/2003 | Hoglund | |
| 2004/0025044 A1 | 2/2004 | Day | |
| 2004/0039968 A1 | 2/2004 | Hatonen | |
| 2004/0168100 A1* | 8/2004 | Thottan | H04L 41/065 714/4.1 |
| 2005/0044406 A1 | 2/2005 | Stute | |
| 2005/0193281 A1 | 9/2005 | Ide | |
| 2006/0085854 A1 | 4/2006 | Agrawal | |
| 2006/0156404 A1 | 7/2006 | Day | |
| 2006/0242705 A1 | 10/2006 | Sadhasivam | |
| 2007/0028220 A1* | 2/2007 | Miller | G06K 9/6251 717/124 |
| 2007/0064617 A1 | 3/2007 | Reves | |
| 2007/0130350 A1 | 6/2007 | Alperovitch | |
| 2007/0130351 A1 | 6/2007 | Alperovitch | |
| 2007/0192863 A1 | 8/2007 | Kapoor | |
| 2007/0245420 A1 | 10/2007 | Yong | |
| 2007/0289013 A1 | 12/2007 | Lim | |
| 2008/0175266 A1 | 7/2008 | Alperovitch | |
| 2008/0177691 A1 | 7/2008 | Alperovitch | |
| 2008/0178259 A1 | 7/2008 | Alperovitch | |
| 2008/0235365 A1* | 9/2008 | Bansal | H04L 43/16 709/224 |
| 2008/0250497 A1 | 10/2008 | Mullarkey | |
| 2008/0262990 A1 | 10/2008 | Kapoor | |
| 2009/0073973 A1 | 3/2009 | Kim | |
| 2009/0245109 A1 | 10/2009 | Hurley | |
| 2010/0071061 A1 | 3/2010 | Crovella | |
| 2010/0082513 A1 | 4/2010 | Liu | |
| 2010/0083055 A1 | 4/2010 | Ozonat | |
| 2010/0121964 A1 | 5/2010 | Rowles | |
| 2010/0202299 A1* | 8/2010 | Strayer | H04L 63/1408 370/252 |
| 2010/0212005 A1 | 8/2010 | Eswaran | |
| 2011/0004935 A1 | 1/2011 | Moffie | |
| 2011/0087924 A1* | 4/2011 | Kandula | G06F 11/0709 714/26 |
| 2011/0098973 A1 | 4/2011 | Seidman | |
| 2011/0267964 A1* | 11/2011 | Baltatu | H04L 43/00 370/242 |
| 2011/0276836 A1 | 11/2011 | Kahana | |
| 2012/0072983 A1 | 3/2012 | McCusker | |
| 2012/0117254 A1 | 5/2012 | Ehrlich | |
| 2012/0137367 A1 | 5/2012 | Dupont | |
| 2012/0331553 A1 | 12/2012 | Aziz | |
| 2013/0198565 A1* | 8/2013 | Mancoridis | G06F 21/554 714/26 |
| 2013/0305357 A1* | 11/2013 | Ayyagari | H04B 7/18593 726/22 |

OTHER PUBLICATIONS

Gu, et al., Online Failure Forecast for Fault-Tolerant Data Stream Processing, 2008.

Pan, et al., Ganesha: Black-Box Diagnosis of MapReduce Systems, ACM SIGMETRICS Performance Evaluation Review, 2009, pp. 8-13, vol. 37, Issue 3.

Tan, et al., Adaptive System Anomaly Prediction for Large-Scale Hosting Infrastructures, 2010.

Tan, et al., On Predictability of System Anomalies in Real World, 18th Annual IEEE/ACM Int. Symp. on Modeling, Analysis and Simulation of Computer and Telecom Systems, 2010.

* cited by examiner

VECTOR-BASED ANOMALY DETECTION

CROSS REFERENCE TO RELATED APPLICATIONS

This application claims the benefit of priority to U.S. patent application Ser. No. 16/248,305 filed Jan. 15, 2019, entitled "VECTOR-BASED ANOMALY DETECTION," which claims priority to U.S. patent application Ser. No. 15/480,646 filed Apr. 6, 2017, entitled "VECTOR-BASED ANOMALY DETECTION," which claims priority to U.S. patent application Ser. No. 14/887,842 filed Oct. 20, 2015, entitled "VECTOR-BASED ANOMALY DETECTION," which claims priority to U.S. patent application Ser. No. 14/181,228 filed Feb. 14, 2014, entitled "VECTOR-BASED ANOMALY DETECTION," which claims priority to U.S. patent application Ser. No. 13/024,176 filed Feb. 9, 2011, entitled "VECTOR-BASED ANOMALY DETECTION," which claims priority to U.S. Provisional Application Ser. No. 61/415,267 filed Nov. 18, 2010, entitled "VECTOR-BASED ANOMALY DETECTION." All of these patents and applications are incorporated by reference in their entirety.

FIELD OF THE INVENTION

The field of the invention is distributed computing behavior monitoring technologies.

BACKGROUND

As local networking fabrics interact with the Internet and cyber attacks continue to grow to threaten use of the fabrics, many entities including corporations, governments, or militaries seek to detect anomalies associated with their fabrics. Unfortunately, known anomaly detection techniques fail to adequately cover the full fabric or provide sufficient capabilities to detect subtle intrusions. Consider the following previous efforts directed to detecting attacks.

U.S. Pat. No. 7,234,168 to Gupta titled "Hierarchy-Based Method and Apparatus for Detecting Attacks on a Computer System", filed Jun. 13, 2002, describes classifying intrusions according to a hierarchy, then traversing the hierarchy to identify a type of attack and determine possible counter measures.

U.S. Pat. No. 7,793,138 to Rastogi et al. titled "Anomaly Detection for Storage Traffic in a Data Center", filed Dec. 21, 2005, discusses detection of deviations from traffic in a storage area network where the deviations can indicate an anomaly type.

U.S. patent application publication 2007/0064617 to Reves titled "Traffic Anomaly Analysis for the Detection of Aberrant Network Code", filed Sep. 16, 2005, describes monitoring traffic from various nodes in a network to determine if the nodes have been infected by aberrant code.

U.S. Pat. No. 7,779,119 to Ginter et al. titled "Event Monitoring and Management" filed May 30, 2007, describes using agents in a network to report data on network activity. When a signature matches an alarm condition a notification can be sent.

Unless the context dictates the contrary, all ranges set forth herein should be interpreted as being inclusive of their endpoints and open-ended ranges should be interpreted to include commercially practical values. Similarly, all lists of values should be considered as inclusive of intermediate values unless the context indicates the contrary.

Although the above references are useful in monitoring network data, they fail to address several key points. First, sending raw data throughout the network is consumptive of time and bandwidth. Second, simply comparing a set of parameters against a static list of conditions leaves gaps in intrusion detection because new threats might not yet be defined by previously defined conditions.

What has yet to be appreciated is that an anomaly can relate to multiple, possibly correlated, behaviors rather than multiple individual metrics. A better approach to would be to monitor a fabric behavior with respect to a vector of behavior metrics where the metrics can be weakly correlated, strongly correlated, or lack correlation. Furthermore, detection criteria for detecting an anomaly based on the vector can be disaggregated and sent among relevant networking nodes. It has also yet to be appreciated that it is unnecessary to aggregate raw data to determine if an anomaly has occurred, is occurring, or is about to occur. Each network node can locally monitor one or more vectors of behavior metrics relating to an anomaly criterion. When the criterion is satisfied, the node can report a criterion status rather than sending bulk raw data.

Thus, there is still a need for method of detecting anomalies in a network fabric.

SUMMARY OF THE INVENTION

The inventive subject matter provides apparatus, systems and methods in which one can detect anomalous behavior of a fabric by monitoring measured vectors of behavior metrics with respect to a baseline vector of behavior metrics. One aspect of the inventive subject matter includes a method of detecting anomalous behavior within a network fabric. A nominal behavior of the fabric can be characterized as a baseline vector comprising a plurality of behavior metrics. One should appreciate the metrics can be correlated or uncorrelated with respect to each other, but could be correlated with a threat. An anomalous behavior can be determined as a function of a variation from the baseline vector where the variation could result from changes in one or more measured behavior metrics. One can establish anomaly detection criteria as a function of the variation of from the baseline vector. The criteria can then be broken into one or more anomaly criterion, which can be disseminated among networking nodes within the fabric. As the fabric routes traffic through various nodes, each node can calculate a status of its local anomaly criterion as a function of a measured vector of behavior metrics representing the node's local perception of the fabric. Each node can submit its calculated status to another node if desired. The collection of statuses can then be used to determine if an anomalous behavior has occurred, is occurring, or is about to occur.

Various objects, features, aspects and advantages of the inventive subject matter will become more apparent from the following detailed description of preferred embodiments, along with the accompanying drawing figures in which like numerals represent like components.

DETAILED DESCRIPTION

It should be noted that while the following description is drawn to fabric networking nodes, some operating as a fabric manager, various alternative configurations are also deemed suitable and may employ various computing devices including routers, switches, interfaces, systems, databases, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclose apparatus. In especially preferred embodiments, the various servers, systems, databases, or interfaces exchange data using standardized protocols or algorithms, possibly based on TCP, UDP, IP, Ethernet, wireless signally, HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

One should appreciate that the disclosed techniques provide many advantageous technical effects including a fabric communication infrastructure capable of self-detecting anomalous behavior among distinct physical nodes within the fabric at fine level of granularity.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Figure 1:
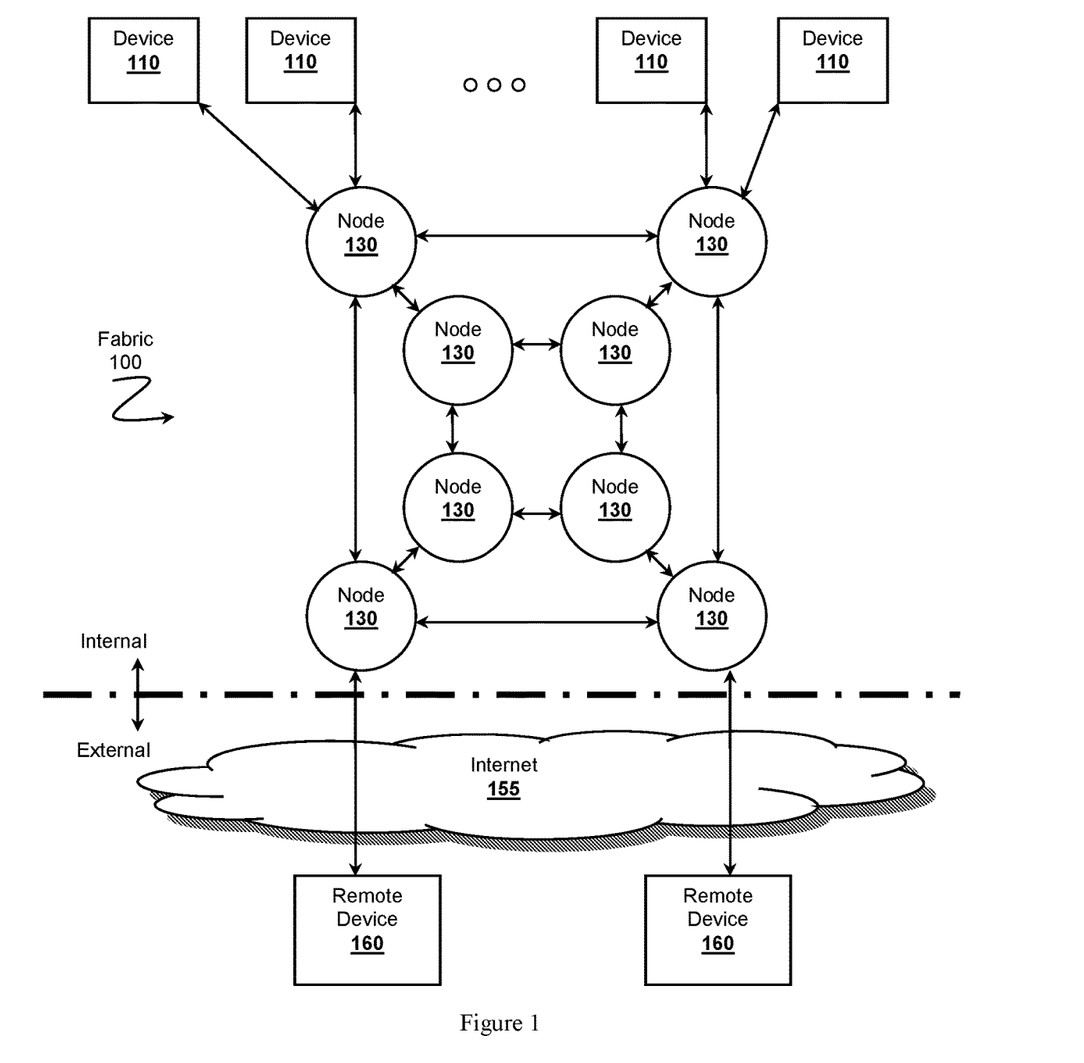
FIG. 1 is a schematic of fabric comprising hybrid transport-computation fabric apparatus.

In FIG. 1, network fabric 100 comprises multiple networking nodes 130 and provides a communication infrastructure among internal devices 110 and external remote devices 160 over Internet 155. Fabric 100 can exist as part of a corporate network spread over a large geographic region, government network spread across the planet, or other type of network. In some embodiments, the network can be integral with the Internet. As illustrated network fabric 100 is considered an internal fabric which is under control of a single entity (e.g., organization, company, etc.). Devices 110 are considered internal to fabric 100 because they operate under authority granted by the entity while devices 160 are external from fabric 100 because they operate outside the jurisdiction of the entity.

Each node 130 preferably comprises a networking switch operating as a hybrid-fabric apparatus cable of transporting data across fabric 100 from one networking node 130 to another while also providing a distributed application engine. Distributed applications can be deployed on nodes 130 and executed as software instructions. Each node 130 can include processors, memory, ports, or other apparatus components that can be individually assigned to data transport operations, an application's execution, or other role or responsibility. One example of a suitable switch that can be adapted for use with the disclosed techniques includes the Raptor Networks Technology™, Inc. ER-1010 switch.

Another example of suitable hybrid-fabric network apparatus is described in co-pending U.S. patent application having Ser. No. 12/849,521 to Wittenschlaeger titled "Hybrid Transport-Application Network Fabric Apparatus", filed Aug. 3, 2010.

Each node 130 can be fungible with respect to the other nodes 130, and can be configured to operate as a fabric manager capable of managing one or more aspects of fabric 100. Nodes 130 can also measure one or more behavior metrics representative of a behavior of fabric 100. As fabric 100 operates, nodes 130 measure or collect behavior metrics. A fabric manager can compare aggregated metrics with nominal behaviors. Furthermore, the metrics can be stored in a black box memory recording a history of the fabric from the node's local perspective. The history, metrics, behaviors or other data can be captured at a fabric level, apparatus level, or even down to a component level (e.g., processor, memory port, etc.).

Figure 2:
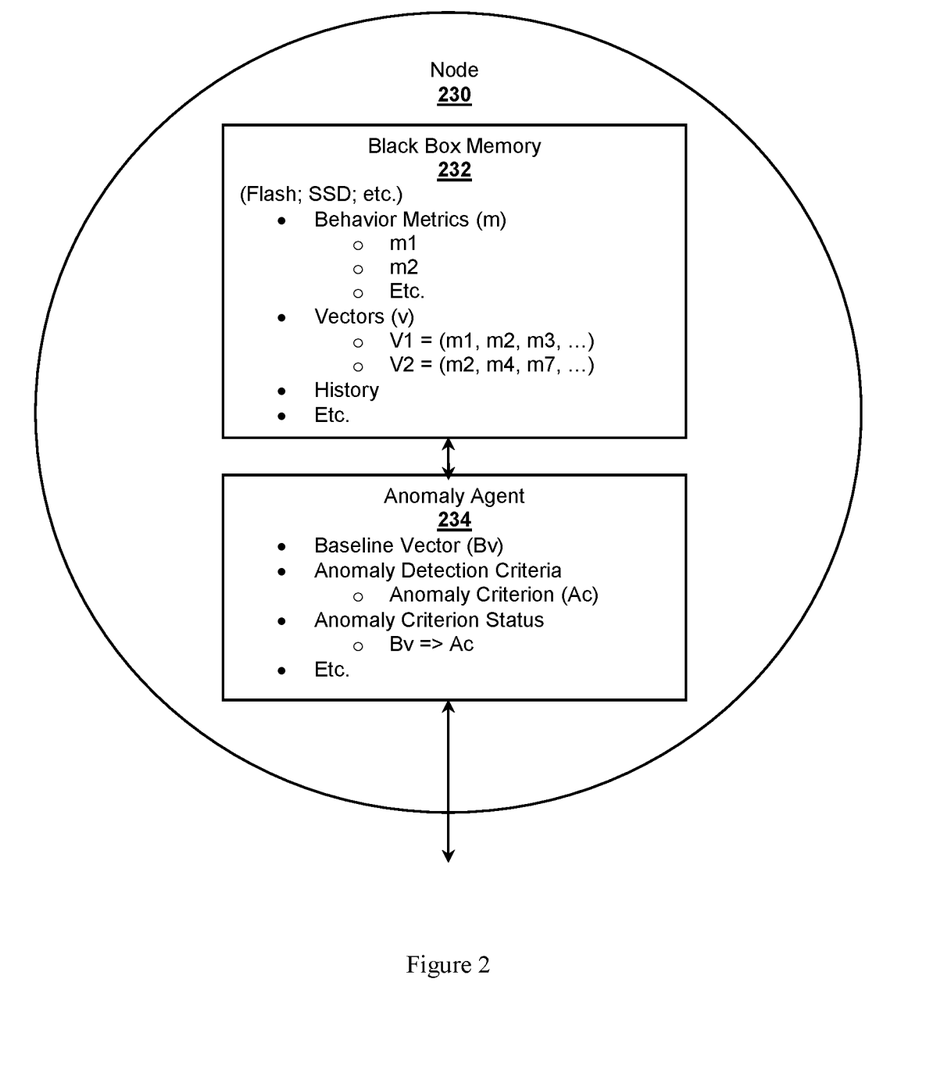
FIG. 2 is a schematic of a hybrid-fabric apparatus having a black box memory.

In FIG. 2, networking node 230 represents a hybrid-fabric apparatus and has been outfitted with black box memory 232. The memory itself can include a non-volatile memory (e.g., ROM, Flash, SSD, disk, etc.) preferably secured against tampering. In some embodiments, black box memory 232 can be configured to comply with FIPS 140 requirements. Black box memory 232 can store behavior metrics, vectors of behavior metrics of interest, historical data, or other information. If networking node 230 becomes damaged, black box memory 232 can provide some information regarding events leading to the failure of node 230.

In some embodiments, network node 230 includes anomaly agent 234. Anomaly agent 234 can be configured to acquire or manage measured vectors of behavior metrics, or interact with a remote fabric manager. As desired agent 234 can calculate a status from the metrics with respect to anomaly detection criteria, or anomaly criterion, preferably as a function of a variation from a baseline vector of behavior metrics. Furthermore, agent 234 can communicate a calculated status with other nodes 230 via one or more data channels within the fabric. In some embodiments, a channel can be dedicated for distributing anomaly statuses among nodes. For example, a fabric manager can established that all anomaly status traffic should be exchanged over a specific wavelength (e.g., a logical channel) on optic fiber connections among nodes. Such an approach ensures that anomaly status information does not interfere with general data transport.

Figure 3:
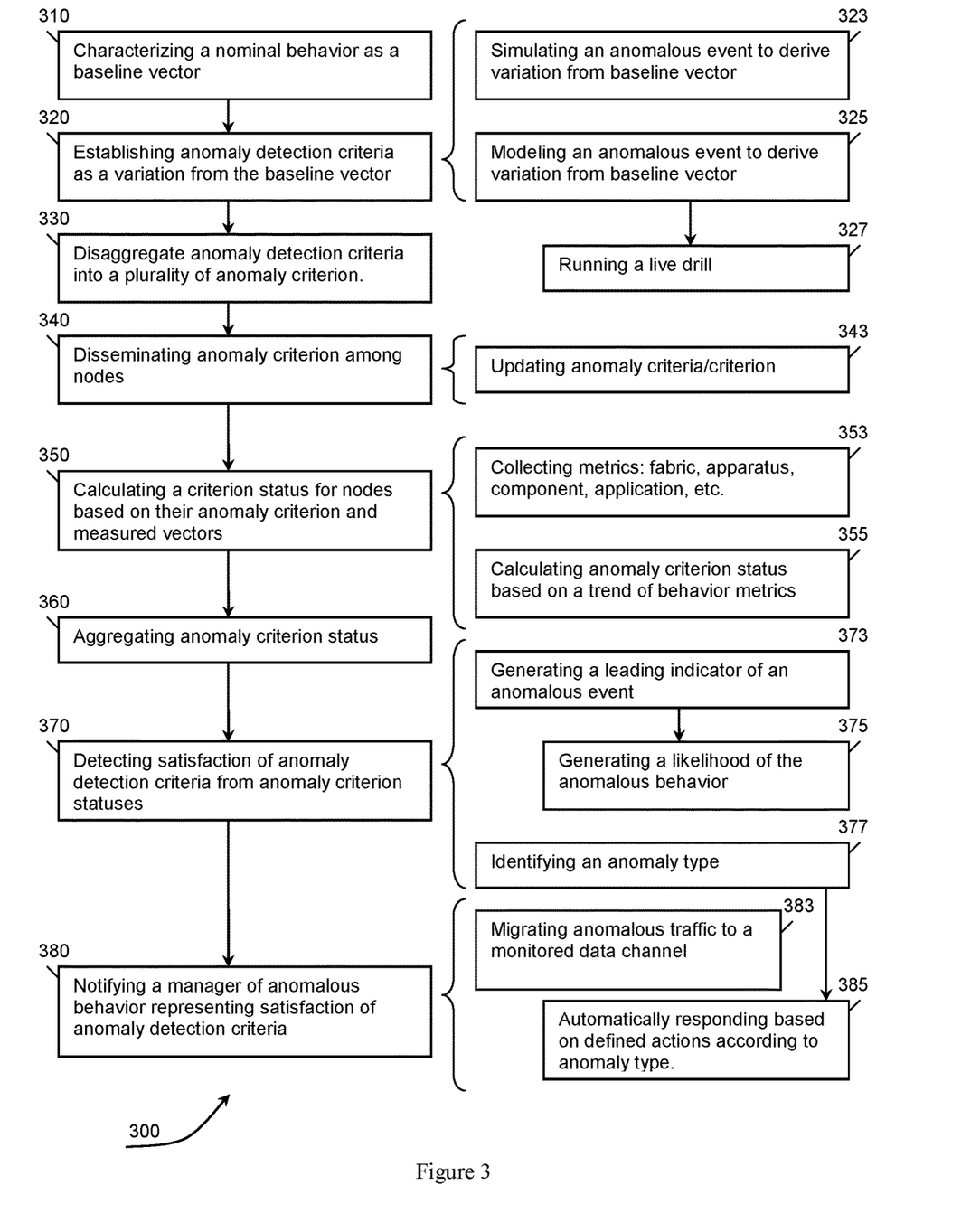
FIG. 3 is a possible method of detecting anomalous behavior within a network fabric of hybrid-fabric apparatus.

FIG. 3 provides an overview of a method 300 for detecting an anomalous behavior within a fabric based on one or more measured vectors of behavior metrics as compared to vectors representing nominal behavior.

At step 310, a nominal behavior can be characterized as a baseline vector. The vector can comprise behavior metrics related to the fabric where the behavior metrics can be associated with internal aspects of the fabric or external elements (e.g., remote devices, remote addresses, etc.) beyond the edge of the fabric, as least to the extent visible to the node measuring the metrics. Behavior metrics can represent aspects of the operating fabric according to various levels of granularity. For example metrics can range from fabric-level metrics (e.g., total aggregated load, bandwidth, etc.), apparatus-level metric (e.g., load on a node, total data exchanged through node, available channels, etc.), or even down to component-level metrics (e.g., available memory, CPU load, etc.). Metrics can be single valued (e.g., available memory, latency, etc.) or multi-valued (e.g., array of values with time-stamps). Metrics can also be considered dynamic reflecting different values at different times, or can be composites of multiple basic metric. An example composite metric might include a calculated value derived from current load value divided by number of active ports. Such a metric could be considered a load/port density.

One should appreciate that the baseline vector is more than a mere list of metrics having values. The vector can include a representation of how the metrics behave with time, how the metrics correlate with each other, or reflect other properties representing a dynamic behavior of a fabric. In some embodiments, the baseline vector is derived by monitoring the fabric over a period of time and establishing the baseline vector by looking for correlated metrics. For example, multi-variate analysis can be performed with respect to metrics to determine if one metric is correlated with another. Other algorithms could also be used to establish baseline vectors or anomalous conditions including genetic algorithms, neural networks, bloom filters, or other known AI techniques. Vectors can be considered a manageable data object that can be stored, moved, updated, removed, or otherwise managed as an independent object from other objects. One aspect of the inventive subject matter is considered to include instantiating a baseline vector object from one or more generic vector objects.

Each member of a vector can be constructed to represent various aspects of the fabric including the fabric as a whole, an apparatus, or a component as desired. Still further, a vector can also comprise member elements that reflect non-fabric elements possibly including remote devices, remote addresses, weather conditions, sensor data, geo-locations, news events, sporting events, stock prices, or other attributes associated with non-fabric information. Vectors can also comprise other vectors as a member element.

Baseline vectors can take on many different forms. A baseline vector can represent an overall nominal behavior of a fabric as well as different types of nominal behavior. For example, multiple baseline vectors can be established to represent aspects of the fabric. One could establish a baseline vector representing nominal traffic flow through the fabric (e.g., routes, data loads, latency, etc.) while other vectors could represent operating health (e.g., temperature, error rates, etc.).

Figure 4:
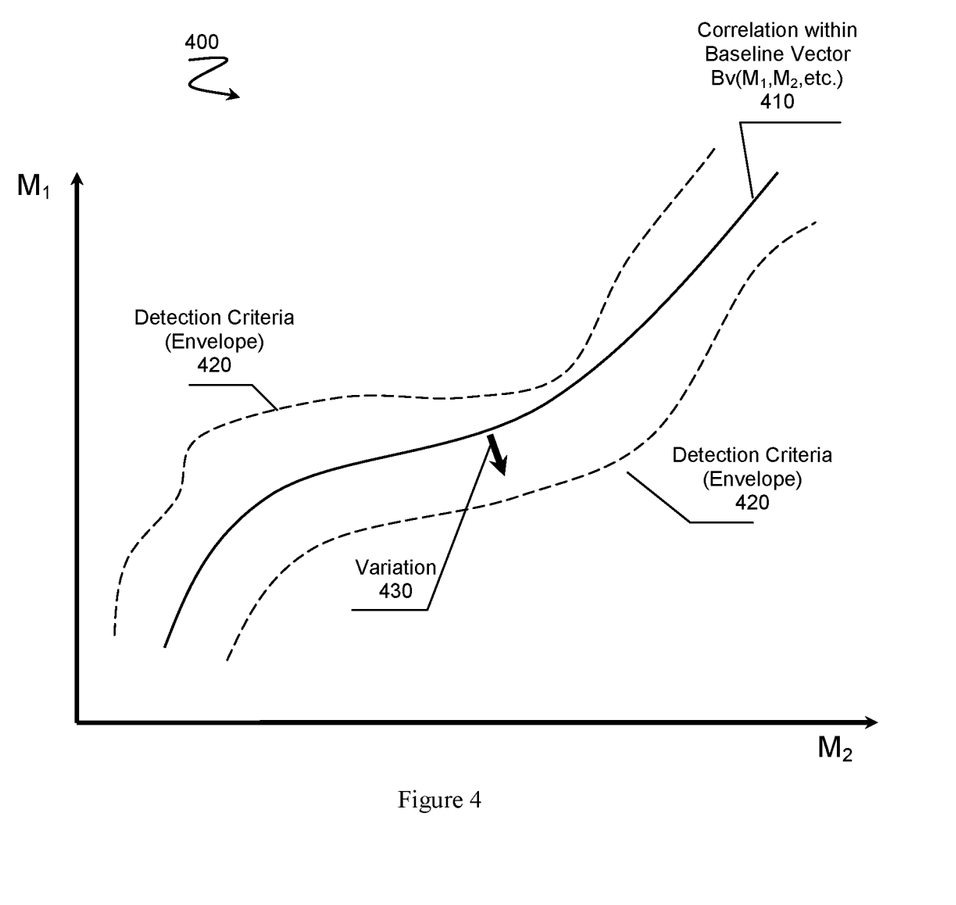
FIG. 4 is graphical representation of detection criteria for an anomalous behavior based on a variation from a correlation of behavior metrics within a baseline vector.

Step 320 includes establishing anomaly detection criteria as a function of a variation from the baseline vector where the criteria represent an aspect of a possible anomalous behavior (see FIG. 4). The criteria can be constructed to represent various conditions reflecting an anomalous behavior. The detection criteria can reflect that (a) an anomalous behavior has occurred, (b) an anomalous behavior is about to occur, or (c) an anomalous behavior is likely to occur. One should note the criteria depend on a variation from the baseline vector as opposed to solely based on deviations of one or more metrics. The variation can be calculated based on a variation function applied to measured behavior metric having the same member elements as the baseline vector. One example variation function can include a Chi-Square fit to members of the measure vector compared to the baseline vector. If the Chi-Squire value exceeds a threshold, an anomalous behavior might be present. It should be appreciate that temporal properties can be incorporated in the measurement of the variation. All vector-based variation functions are contemplated.

A single set of anomaly detection criteria can be associated with a type of anomaly (e.g., intrusion, attack, error condition, maintenance problem, etc.) or even with a specific anomaly (e.g., denial of service attack). The anomaly detection criteria can be stored as an object and can include attributes describing the types of anomaly for which the detection criteria is applicable. As discussed further below, a single set of anomaly detection criteria can comprise indicators for multiple, distinct anomaly types.

The anomaly detection criteria can be established using numerous techniques. In some embodiments, a fabric manager can access a human manager interface to define the anomaly detection criteria. Other more preferable and automatic methods are also contemplated. For example, step 323 can include simulating an anomalous behavior within the fabric while the fabric is active. Running a simulation is considered to include running a self-contained software application designed to mimic the fabric experiencing anomalous behavior. In some embodiments, where the networking nodes of the fabric include hybrid-fabric apparatus capable of general purpose computation, the simulation can be deployed on one or more of the networking nodes. Such an approach allows for gaining an understanding of how an anomalous behavior affects vectors of behavior metrics without substantially impacting the fabric in general. Real-world, real-time existing metrics can be fed into the simulation to gain a better simulation. Running a simulation of an anomalous behavior is considered advantageous because the simulation can be run multiple times to build statistics reflecting variations around the baseline vector or reflecting anomalous behavior. However, simulations likely produce less accurate results than a real-world experience.

Another technique for establishing anomaly detection criteria can include step 325. Step 325 includes modeling an anomalous behavior within the fabric while the fabric is operating. Modeling the behavior is considered to include constructing a logical representation of the fabric by using actual nodes that exchange data among each other within boundaries of a baseline vector. An anomalous behavior can be introduced or injected into the modeled fabric, and then the effects can be directly observed in a more accurate real-world environment. A vector of behavior metrics can be measured and compared to the baseline vector to determine how the measured behavior vector varies from the baseline vector. Thus, the variation can be measured directly from real-world or real-time conditions. Modeling the fabric is contemplated to provide more accurate results over a simulation. However, a model of the fabric can adversely impact fabric performance. Furthermore, it would likely be difficult to build statistics around the modeling of the various behaviors. It is also contemplated that both simulating and modeling the fabric can be used to derive anomaly detection criteria.

In addition to modeling the fabric, step 327 can include running a live drill. Consider a government fabric that requires high security. The managers of the fabric can conduct a live drill by introducing an anomalous behavior on a live, active fabric. The managers are essentially modeling the behavior while directly observing or collecting data reflecting measured vectors of behavior metrics.

Step 330 can include disaggregating the anomaly detection criteria into one or more anomaly criterion. Each criterion is considered to be function of a measured vector of behavior metrics rather than merely a metric threshold value. The function can result in a continuous set of values representing a status of the criterion. An anomaly criterion, by itself, would likely fail to provide sufficient insight into an anomalous behavior. However, when the statuses of most, if not all, of the anomaly criterion are aggregated, sufficient information might be available to indicate that an anomalous behavior is present.

Step 340 includes disseminating anomaly criterion to one or more networking nodes within the fabric. Each node can be responsible for comparing locally obtained behavior metrics forming a measured vector of behavior metrics against the node's stored anomaly criterion. An anomaly criterion is also considered to be dynamic criterion that can change with time. For example, the criterion can include a behavior profile of one or more measured vector of behavior metrics. Furthermore, the criterion can be updated if required due to the fabric environment changing.

Step 343 can include updating the anomaly detection criteria currently being monitored by the fabric. Updating the detection criteria can include changing the anomaly detection criteria, and in response, the anomaly criterion stored on the nodes. Updating the conditions for detecting an anomalous behavior allows for taking into account the fabric's changing state while still being considered to fall within a nominal range of behavior. For example, a baseline vector could present a steady state traffic flow where no applications are executing within the fabric. When a new application is introduced to the fabric, the anomaly detection criteria can be changed to ensure that an anomaly detection event is not erroneously triggered. If the anomaly detection criteria are updated, the anomaly criterion can also be updated if desired, but might not necessary because the updated detection criteria might still be able to leveraged existing disseminated criterion.

Step 350 includes having each node calculate a criterion status for each criterion for which it is responsible. As mentioned previously, each criterion can comprise a function, or algorithm, applied to measured vector of behavior metrics. The result of the function, single valued or multi-valued, represents a status. The status can include a binary satisfied or not-satisfied indicator or can include other values as well including a real number, a continuous value, a string, or other types of data. When desired, the status can be sent by a node's anomaly agent to a remote node for further analysis. Statuses can be sent periodically, in response to a polling event, continuously, or with other frequency. By sending only a status as opposed to raw data, the amount of traffic on the network is reduced and the impact on general data transport is minimized. Thus, the fabric can be self monitored in a distributed, parallel manner.

Step 353 can include networking nodes collecting or otherwise obtaining vectors of behavior metrics that can be analyzed in real-time relative to the anomaly criterion present at the node. Obtaining the behavior metrics can include measuring metrics locally, calculating behavior metrics, reading sensors, accessing the memory or black box for historical data, exchanging behavior metrics or criterion status with other nodes, or any other type of collecting data. Collecting metrics can include collecting fabric-level metrics, apparatus-level metrics, component-level metrics, or even metrics associated with one or more applications running within fabric.

As indicated by step 355, calculating a criterion status can include calculating the status based on a trend in measured behavior metrics. For example, a variation from the baseline vector could include a variation in a rate of change of a time varying vector, metric, or rate of change of one metric relative to another (see FIG. 4). A trend can be established by accessing historical vectors or metric values, possibly stored in the black box memory, and analyzing the metrics for observed trends. One should appreciate that a trend is considered to be a patterned behavior of one metric relative to another. Typically a trend is with respect to time. However, a trend can be with respect to other metrics as well as mentioned above.

Step 360 includes aggregating anomaly criterion statuses from at least some of the networking nodes that monitor their own anomaly criterion. Aggregating the statuses can include obtaining the statuses over a management channel in the fabric; a logical or physical channel. Typically a network node operating as a fabric manager with respect to anomaly detection aggregates the statuses. Aggregating the statuses can include polling for the statuses, listening for statuses, obtaining statuses as part of a heart beat, or other from of receiving statuses. In some embodiments, the statuses can be sent to a remote device, either internal to the fabric or external to the fabric, as desired.

Step 370 includes detecting satisfaction of the anomaly detection criteria as a function of the anomaly criterion statuses, where satisfaction appears to indicate an anomalous behavior is present. Although satisfaction of the anomaly detection criteria can be a binary result (i.e., satisfied or not-satisfied), in more preferred embodiments satisfaction can vary by degrees according the structure of the anomaly detection criteria. Furthermore, the statuses are not required to indicate satisfaction of a condition. For example, anomaly detection criteria can be partially satisfied where some of the criterion statuses collected from network nodes might indicate the criterion itself has not yet been satisfied or might reflect that a correlated metric outside the bounds of the baseline vector has changed.

Allowing for the anomaly detection criteria to be partially satisfied lays a foundation for a number of opportunities. As suggested by step 373, partial satisfaction can give rise to generating a leading indicator of an anomalous behavior. As criterion statuses are aggregated, the anomaly detection criteria can become "more" satisfied, or possibly less satisfied. At step 375 based on the level of satisfaction of the anomaly criteria or the collected criterion status, one can generate a likelihood of the anomalous behavior is about to occur. The likelihood can represent a probability that the anomalous behavior might occur. In some embodiments, the likelihood can be calculated based on compiled statistic reflecting nominal behavior relative to historical anomalous behavior (e.g., compiled from modeling or simulating anomalous behaviors). Such information can be useful to fabric managers so the managers can address possible risks or take pre-emptive actions.

Step 377 can include identifying an anomaly type of a detected anomalous behavior based on the aggregated anomaly criterion statuses. The statuses, in aggregate, can provide an indication of an anomalous behavior signature. One should note that the signature is based on the aggregated statuses rather than merely a collection of metrics. As stated before, a status does not necessarily equate to a metric. The fabric manager can consult one or more databases, possibly located in the manager's memory, to identify a signature. In some embodiments, a status can be used as an index into an anomaly database to find anomaly types.

Example anomaly types can include attacks, intrusions, infiltrations, natural behavior, unexpected behavior, random events, or other types of anomalous behaviors. As indicated anomaly types do not necessarily have to relate to a fabric threat, but could be a result of natural causes. For example, a natural behavior could result in an unusually high, but natural load that might cause detection of an anomalous behavior. An unexpected behavior could include a cluster of minor events that push a vector of measured behavior metrics outside the detection window of a baseline vector. A random event could simply include a break in a communication line. All anomaly types are contemplated.

Anomalous behaviors can also be classified as being internal to the fabric or external to the fabric. Internal anomalous behaviors reflect an anomalous behavior of the fabric itself or its constituents. One should also appreciate that an anomalous behavior can be detected with respect to external devices communicatively coupled with the fabric. As external devices, or other entities, interact with the fabric, the external device could exhibit unusual behavior beyond an expected nominal behavior where the unusual behavior can be detected based on the disclosed techniques. In view of such a capability, the fabric can distinguish between internal threats originating internally and external threats originating external to the fabric.

Step 380 can include notifying a manager of the anomalous behavior. The manager can be a node operation as a fabric manager, a human being, or other entity having responsibility for managing the fabric. Notifications can be sent via an electronic communication channel (e.g., SMS, email, network management application, SNMP, etc.) as desired.

A notification of the anomalous behavior can include one or more instructions on how to respond to the anomalous behavior. In some embodiments, step 383 can include migrating anomalous traffic to a monitored data channel. For example, if an intrusion is detection, the fabric can automatically reconfigure a routing topology used by the intruder so that the intruder's packets are routed toward a network operations center, a data sink, a honey pot, or the location so the anomalous traffic can be further analyzed in real time.

When the anomaly type is known, as suggested by step 385, the notification could also include instructions on what actions should be taken to respond to the anomalous behavior based on anomaly type. Actions can include storing historical data within the black box memory, migrating black box data to another node's black box, reconfiguring a routing topology, locking one or more data channels or connected devices, or other actions.

FIG. 4 is presented for further clarity and represents a graphical representation 400 of two correlated metrics in a baseline vector. The metrics have a moderately strong correlation as shown where a first metric monotonically increases with respect to the second metric. The two metrics can compose a baseline vector, which can also include a derived relationship between the two metrics (e.g., a trend). Through observation of a nominal behavior represented by correlation 410, anomaly detection criteria 420 are derived as a function of variation 430 around correlation 410. Detection criteria 420 are illustrated as an envelope around correlation 410. The envelope could include contours represent degrees of detection where criteria 420 can be partially satisfied. When a current behavior varies away from the baseline, as indicated by the variation arrow, detection criteria 420 can be checked. If variation 430 satisfies the anomaly criteria then an anomalous behavior is considered to (a) have occurred, (b) is occurring, or (c) is about to occur according the conditions set forth in the criteria.

One should note, as illustrated there can be a single anomaly detection criteria (i.e., the envelope). However, a variation from the baseline vector could be attributed to many differ types of anomalies. Although the graph is presented in two dimensions: as $M_1$ versus $M_2$, it is also contemplated that correlations or criteria could be established based on any number of metrics so that the criteria, variation, correlations, vectors, or other objects could have higher dimensions beyond just two.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A computer-based method for detecting anomalous behavior of a network fabric comprising a plurality of network nodes, the method comprising:

determining a nominal behavior of the network fabric by observing behavior of the plurality of network nodes;

aggregating data associated with anomaly detection criteria distributed among the plurality of network nodes, the anomaly detection criteria each relating to at least one vector comprising at least one measured behavior metrics;

determining that an anomaly is likely to occur for at least one of the plurality of network nodes by analyzing the aggregated data and identifying a variation from nominal behavior of at least part of the network fabric;

performing an operation based on the determination that an anomaly is likely to occur; and updating the anomaly detection criteria based on a known change in the network fabric and sending receiving nodes correspondingly updated anomaly criterion.

2. The computer-based method of claim 1, further comprising:

establishing the anomaly detection criteria by simulating an anomalous behavior within the network fabric while the network fabric is active to derive the variation from a baseline vector.

3. The computer-based method of claim 2, further comprising:

establishing the anomaly detection criteria by modeling the anomalous behavior within the network fabric while the network fabric is active to derive the variation from the baseline vector by constructing a logical representation of the network fabric by using the plurality of network nodes of the network fabric.

4. The computer-based method of claim 2, further comprising:

establishing the anomaly detection criteria by modeling the anomalous behavior by running a live drill.

5. The computer-based method of claim 1, further comprising:

collecting at least one of network-fabric-level metrics as a portion of the at least one measured behavior metrics, component-level metrics as a portion of the at least one measured behavior metrics, application metrics as a portion of the at least one measured behavior metrics, and external metrics as a portion of the at least one measured behavior metrics.

6. The computer-based method of claim 1, wherein some of the plurality of network nodes calculate their anomaly criterion statuses as a function of a trend of the at least one measured behavior metrics.

7. The computer-based method of claim 6, further comprising:
generating a leading indicator of a likelihood that anomalous behavior is about to occur as a function of aggregating the anomaly criterion statuses.

8. The computer-based method of claim 7, further comprising:
generating the leading indicator by calculating a likelihood of the anomalous behavior occurring while the anomaly detection criteria remains unsatisfied.

9. The computer-based method of claim 6, further comprising:
identifying an anomaly type of the anomalous behavior based on the anomaly criterion statuses.

10. The computer-based method of claim 9, further comprising:
responding to the anomalous behavior according to a prior defined action based at least in part on the anomaly type.

11. The computer-based method of claim 6, further comprising:
storing a history of the anomaly criterion statuses in a black-box memory.

12. The computer-based method of claim 11, further comprising:
storing the history by migrating the history from a first one of the plurality of networking nodes to the black-box memory housed within a second, different one of the plurality of networking nodes in response to the anomaly criterion statuses satisfying a migration triggering condition.

13. The computer-based method of claim 1, further comprising:
migrating anomalous traffic to a monitored data channel within the network fabric.

14. The computer-based method of claim 1, wherein the known change comprises an expected behavior change vector reflecting expected behavior changes due to deployment of an application within the network fabric.

15. A network fabric system comprising:
a plurality of network nodes; and
an anomaly agent coupled with the plurality of network nodes and configured to at least:
determine a nominal behavior of the network fabric by observing behavior of the plurality of network nodes;
aggregate data associated with anomaly detection criteria distributed among the plurality of network nodes, the anomaly detection criteria each relating to at least one vector comprising at least one measured behavior metrics;
determine that an anomaly is likely to occur for at least one of the plurality of network nodes by analyzing the aggregated data and identifying a variation from nominal behavior of at least part of the network fabric;
perform an operation based on the determination that an anomaly is likely to occur; and
update the anomaly detection criteria based on an expected behavior change vector reflecting expected behavior changes due to deployment of an application within the network fabric.

16. The network fabric system of claim 15, wherein the anomaly agent is configured to at least establish the anomaly detection criteria by simulating an anomalous behavior within the network fabric while the network fabric is active to derive the variation from a baseline vector.

17. The network fabric system of claim 16, wherein the anomaly agent is configured to at least establish the anomaly detection criteria by modeling the anomalous behavior within the network fabric while the network fabric is active to derive the variation from the baseline vector by constructing a logical representation of the network fabric by using the plurality of network nodes of the network fabric.

18. The network fabric system of claim 16, wherein the anomaly agent is configured to at least establish the anomaly detection criteria by modeling the anomalous behavior by running a live drill.

19. The network fabric system of claim 15, wherein the anomaly agent is configured to at least collect at least one of network-fabric-level metrics as a portion of the at least one measured behavior metrics, component-level metrics as a portion of the at least one measured behavior metrics, application metrics as a portion of the at least one measured behavior metrics, and external metrics as a portion of the at least one measured behavior metrics.

20. The network fabric system of claim 19, wherein the anomaly agent is configured to at least generate a leading indicator of a likelihood that anomalous behavior is about to occur as a function of aggregating the anomaly criterion statuses.

21. The network fabric system of claim 19, wherein the anomaly agent is configured to at least identify an anomaly type of the anomalous behavior based on the anomaly criterion statuses.

22. The network fabric system of claim 15, wherein some of the plurality of network nodes calculate their anomaly criterion statuses as a function of a trend of at least one measured behavior metrics.

23. The network fabric system of claim 22, wherein the anomaly agent is configured to at least generate the leading indicator by calculating a likelihood of the anomalous behavior occurring while the anomaly detection criteria remains unsatisfied.

24. The network fabric system of claim 23, wherein the anomaly agent is configured to at least automatically respond to the anomalous behavior according to a prior defined action based at least in part on the anomaly type.

25. The network fabric system of claim 15, wherein the anomaly agent is configured to at least migrate anomalous traffic to a monitored data channel within the network fabric.

26. The network fabric system of claim 15, wherein the anomaly agent is configured to send receiving nodes correspondingly updated anomaly criterion.

27. A computer-readable non-transitory storage medium including instructions which when executed by one or more processors, cause operations comprising:
determining a nominal behavior of a network fabric by observing behavior of a plurality of network nodes;
aggregating data associated with anomaly detection criteria distributed among the plurality of network nodes, the anomaly detection criteria each relating to at least one vector comprising at least one measured behavior metrics;
determining that an anomaly is likely to occur for at least one of the plurality of network nodes by analyzing the aggregated data and identifying a variation from nominal behavior of at least part of the network fabric;
performing an operation based on the determination that an anomaly is likely to occur; and
storing a history of anomaly criterion statuses in a black-box memory.

28. The computer-readable non-transitory storage medium of claim 27, wherein the instructions, when executed by the one or more processors, cause operations further comprising updating the anomaly detection criteria based on a known change in the network fabric and sending receiving nodes correspondingly updated anomaly criterion.

29. The computer-readable non-transitory storage medium of claim 27, wherein the instructions, when executed by the one or more processors, cause operations further comprising updating the anomaly detection criteria based on an expected behavior change vector reflecting expected behavior changes due to deployment of an application within the network fabric.

* * * * *